(12) United States Patent
Eo (10) Patent No.: US 11,747,521 B2
(45) Date of Patent: Sep. 5, 2023

(54) DISPLAY DEVICE

(71) Applicant: Samsung Display Co., Ltd., Yongin-si (KR)

(72) Inventor: SungWoo Eo, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/567,792

(22) Filed: Jan. 3, 2022

(65) Prior Publication Data

US 2022/0299680 A1    Sep. 22, 2022

Related U.S. Application Data

(63) Continuation of application No. 16/599,654, filed on Oct. 11, 2019, now Pat. No. 11,215,737.

(30) Foreign Application Priority Data

Oct. 12, 2018  (KR) .......................... 10-2018-0121948

(51) Int. Cl.
  *G02B 1/14*     (2015.01)
  *B32B 7/12*     (2006.01)
  *H04M 1/02*     (2006.01)

(52) U.S. Cl.
  CPC ............... *G02B 1/14* (2015.01); *B32B 7/12* (2013.01); *H04M 1/0268* (2013.01); *B32B 2255/28* (2013.01); *B32B 2307/4023* (2013.01); *B32B 2307/546* (2013.01); *B32B 2307/558* (2013.01); *B32B 2457/20* (2013.01)

(58) Field of Classification Search
  CPC .................................. G02B 1/14; B32B 7/12
  USPC .......................................................... 428/216
  See application file for complete search history.

(56) References Cited

U.S. PATENT DOCUMENTS

| | | |
|---|---|---|
| 9,857,506 B2 | 1/2018 | Kim |
| 10,096,792 B2 | 10/2018 | Ahn et al. |
| 10,347,700 B2 | 7/2019 | Yang et al. |
| 10,461,274 B2 | 10/2019 | Kim |
| 10,490,770 B2 | 11/2019 | Kim et al. |

(Continued)

FOREIGN PATENT DOCUMENTS

| | | |
|---|---|---|
| CN | 103390374 | 11/2013 |
| CN | 106488668 | 3/2017 |

(Continued)

OTHER PUBLICATIONS

Extended European Search Report dated Mar. 6, 2020, in European Patent Application No. 19202383.6.

(Continued)

*Primary Examiner* — Tahseen Khan
(74) *Attorney, Agent, or Firm* — H.C. Park & Associates, PLC (57) ABSTRACT

A display device includes a window film with light leak prevention layers that may withstand repeated folding operations. The window film includes a first film having a first surface configured to provide an outermost surface and a second surface, a second film disposed below the first film and having a third surface and a fourth surface, a first color layer disposed on at least one of the second surface and the third surface, and a second color layer disposed below the first color layer and disposed on at least one of the third surface and the fourth surface.

13 Claims, 11 Drawing Sheets

(56) References Cited

U.S. PATENT DOCUMENTS

| | | | |
|---|---|---|---|
| 10,986,744 B2 | 4/2021 | Yeum et al. | |
| 2009/0266479 A1* | 10/2009 | Chung | B32B 33/00 |
| | | | 156/247 |
| 2010/0232162 A1* | 9/2010 | Shin | H01L 51/5284 |
| | | | 362/293 |
| 2013/0301272 A1 | 11/2013 | Wang | |
| 2014/0347612 A1* | 11/2014 | Park | G02F 1/133514 |
| | | | 349/106 |
| 2015/0078033 A1* | 3/2015 | Lee | G02F 1/133605 |
| | | | 362/609 |
| 2016/0124127 A1* | 5/2016 | Jang | H01L 51/524 |
| | | | 359/894 |
| 2016/0223722 A1 | 8/2016 | Ahn | |
| 2016/0372701 A1 | 12/2016 | Kwon et al. | |
| 2017/0146710 A1* | 5/2017 | Jin | G06F 1/1656 |
| 2017/0323779 A1* | 11/2017 | Um | G02F 1/13454 |
| 2018/0004254 A1 | 1/2018 | Park et al. | |
| 2018/0034001 A1 | 2/2018 | Hwang et al. | |
| 2018/0076412 A1* | 3/2018 | Kim | H01L 51/56 |
| 2018/0132371 A1 | 5/2018 | Yeum et al. | |
| 2018/0335552 A1* | 11/2018 | Cheon | G02F 1/1333 |
| 2020/0257398 A1 | 8/2020 | Oohira | |

FOREIGN PATENT DOCUMENTS

| | | |
|---|---|---|
| CN | 107230693 | 10/2017 |
| CN | 107250879 | 10/2017 |
| CN | 107809873 | 3/2018 |
| CN | 108074489 | 5/2018 |
| KR | 10-2014-0058762 | 5/2014 |
| KR | 10-1512185 | 4/2015 |
| KR | 10-2016-0095708 | 8/2016 |
| KR | 10-2017-0059543 | 5/2017 |
| KR | 10-2017-0122881 | 11/2017 |
| KR | 10-2018-0012913 | 2/2018 |
| KR | 10-2018-0053483 | 5/2018 |

OTHER PUBLICATIONS

Non-Final Office Action dated Apr. 8, 2020, in U.S. Appl. No. 16/599,654.

Final Office Action dated Oct. 8, 2020, in U.S. Appl. No. 16/599,654.

Notice of Allowance dated Sep. 1, 2021, in U.S. Appl. No. 16/599,654.

* cited by examiner

DISPLAY DEVICE

CROSS-REFERENCE TO RELATED APPLICATION

This application is a Continuation of U.S. patent application Ser. No. 16/599,654, filed on Oct. 11, 2019, which claims priority from and the benefit of Korean Patent Application No. 10-2018-0121948, filed on Oct. 12, 2018, which is hereby incorporated by reference for all purposes as if fully set forth herein.

BACKGROUND

Field

Exemplary embodiments/implementations of the invention relate generally to a foldable display device.

Discussion of the Background

A display device displays various images on a display screen to provide information to a user. In general, the display device displays information within an assigned screen. In recent years, flexible display devices including a foldable flexible display panel have been developed. The flexible display device may be folded, rolled, or bent unlike a rigid display device. The flexible display device, which can change its shape variously, may be carried regardless of a typical screen size to thus improve convenience of a user. Repeated folding of the flexible display device may generate a crack or damage in some components of the flexible display device.

The above information disclosed in this Background section is only for understanding of the background of the inventive concepts, and, therefore, it may contain information that does not constitute prior art.

SUMMARY

Devices and methods according to exemplary implementations/embodiments of the invention are capable of providing reliable window film that may withstand repeated folding and bending for practical usage of flexible and foldable display devices.

The present disclosure provides a display device having a structure that protects a color layer disposed on a window of a display device from being damaged when the display device is folded.

An embodiment of the inventive concept provides a window film for a display device including: a first film having a first surface configured to provide an outermost surface and a second surface; a second film disposed below the first film and having a third surface and a fourth surface; a first color layer disposed on at least one of the second surface and the third surface; and a second color layer disposed below the first color layer and disposed on at least one of the third surface and the fourth surface. Also, the first color layer has a first area greater than a second area of the second color layer.

In an embodiment, a sum of a first thickness of the first color layer and a second thickness of the second color layer may be about 7 µm or more to about 15 µm or less.

In an embodiment, the window film may further include a first adhesion layer disposed between the first film and the second film.

In an embodiment, the window film may further include a third color layer disposed between the first color layer and the second color layer.

In an embodiment, the third color layer may have a third area equal to or larger than the second area.

An embodiment of the inventive concept provides a display device including the window film.

In an embodiment, the display device may further include display module disposed below the window film. The window film may include a first portion and a second portion disposed adjacent to the first portion. Here, the first portion may be flat, and the second portion may be foldable.

In an embodiment, the first color layer and the second color layer may be disposed in the first portion and the second portion.

In an embodiment, the first color layer and the second color layer may be disposed in the second portion.

In an embodiment, the window film may further include a third color layer disposed in the first portion, and the third color layer may be disposed on the second surface, the third surface, or the fourth surface.

In an embodiment, the third color layer may have a third thickness greater than each of a first thickness of the first color layer and a second thickness of the second color layer.

In an embodiment, a sum of a first thickness of the first color layer and a second thickness of the second color layer may be substantially equal to a third thickness of the third color layer.

In an embodiment, a first width of the first color layer in a first direction may be greater than a second width of the second color layer in the first direction.

In an embodiment, a first thickness of the first color layer may be different from a second thickness of the second color layer.

In an embodiment of the inventive concept, a display device includes: a flexible window film; and a display module disposed below the window film. Here, the window film includes: a first film having a first surface and a second surface; a second film disposed below the first film and having a third surface and a fourth surface; a first color layer disposed on one of the second surface, the third surface, and the fourth surface; and a second color layer disposed on one of the third surface and the fourth surface which the first color layer is not disposed. Also, a sum of a first thickness of the first color layer and a second thickness of the second color layer is about 7 µm or more to about 15 µm or less.

In an embodiment, the first color layer may have a first area greater than a second area of the second color layer.

In an embodiment, the window film may include a first portion and a second portion disposed adjacent to the first portion, the first portion may be flat, the second portion may be foldable, the first color layer and the second color layer may overlap the second portion, the window film may further include a third color layer overlapping the first portion, the third color layer may be disposed on the second surface, the third surface, or the fourth surface, and a third thickness of the third color layer may be greater than each of a first thickness of the first color layer and a second thickness of the second color layer.

In an embodiment, the window film may further include a third color layer disposed below the second color layer and disposed on the fourth surface.

In an embodiment of the inventive concept, a display device includes: a foldable display module; a plurality of films disposed on the foldable display module; and a first color layer disposed on one surface of one film of the plurality of films. Here, the first color layer has a thickness of about 7 µm or less.

In an embodiment, the display device may further include a second color layer disposed on the other surface of the one film or one surface of another film of the plurality of films. Here, the second color layer may have a thickness of about 7 µm or less.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
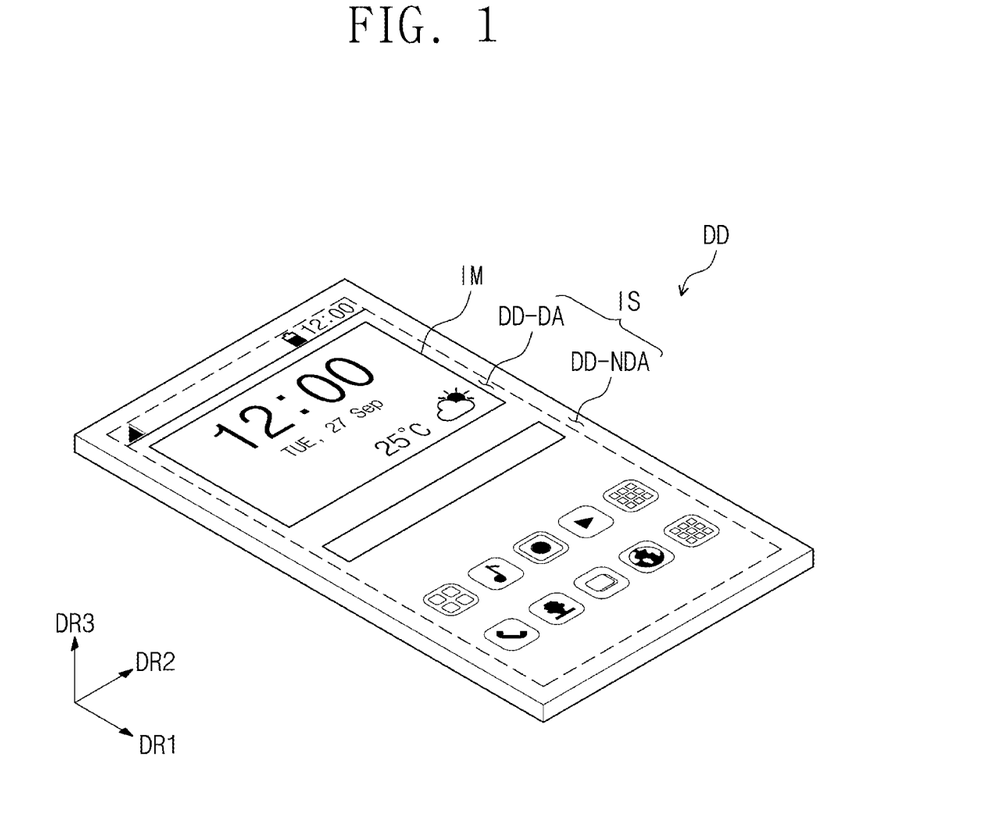
FIG. 1 is a perspective view illustrating a display device according to an embodiment of the inventive concept.

FIG. 1 is a perspective view illustrating a display device DD according to an embodiment of the inventive concept. As illustrated in FIG. 1, a display surface IS on which an image IM is displayed is parallel to a surface defined by a first direction DR1 and a second direction DR2. A normal direction of the display surface IS, i.e., a thickness direction of the display device DD, indicates a third direction DR3. A front surface (or top surface) and a rear surface (or bottom surface) of each of members are distinguished by the third direction DR3. However, directions indicated by the first to third directions DR1, DR2, and DR3 may be a relative concept and converted with respect to each other. Hereinafter, first to third directions may be indicated by the first to third directions DR1, DR2, and DR3 and designated by the same reference numerals, respectively.

The display device DD according to an embodiment of the inventive concept may be a foldable display device. The display device DD according to an embodiment of the inventive concept may be used for large-sized electronic equipment such as televisions and monitors and small and medium-sized electronic equipment such as mobile phones, tablet PCs, navigation units for vehicles, game consoles, and smart watches.

As illustrated in FIG. 1, the display surface IS of the display device DD may include a plurality of areas. The display device DD includes a display area DD-DA on which the image IM is displayed and a non-display area DD-NDA disposed adjacent to the display area DD-DA. The non-display area DD-NDA may be an area on which an image is not displayed. FIG. 1 illustrates icons of applications and a clock indicator as an example of the image IM. The display area DD-DA may have a rectangular shape. The non-display area DD-NDA may surround the display area DD-DA. However, the embodiment of the inventive concept is not limited thereto. For example, the display area DD-DA and the non-display area DD-NDA may be relatively designed in shape.

FIGS. 2A to 2E are views, each of which exemplarily illustrates a folded state of the display device DD in FIG. 1.

Figure 2A:
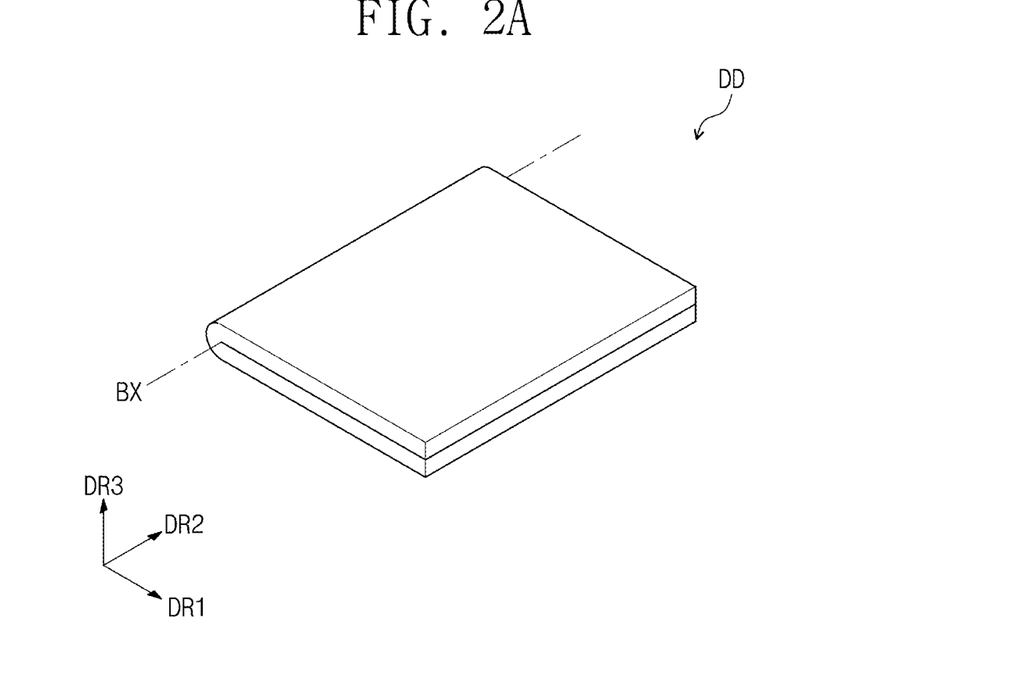
FIGS. 2A to 2E are views each exemplarily illustrating a state in which the display device in FIG. 1 is folded.
Figure 2B:
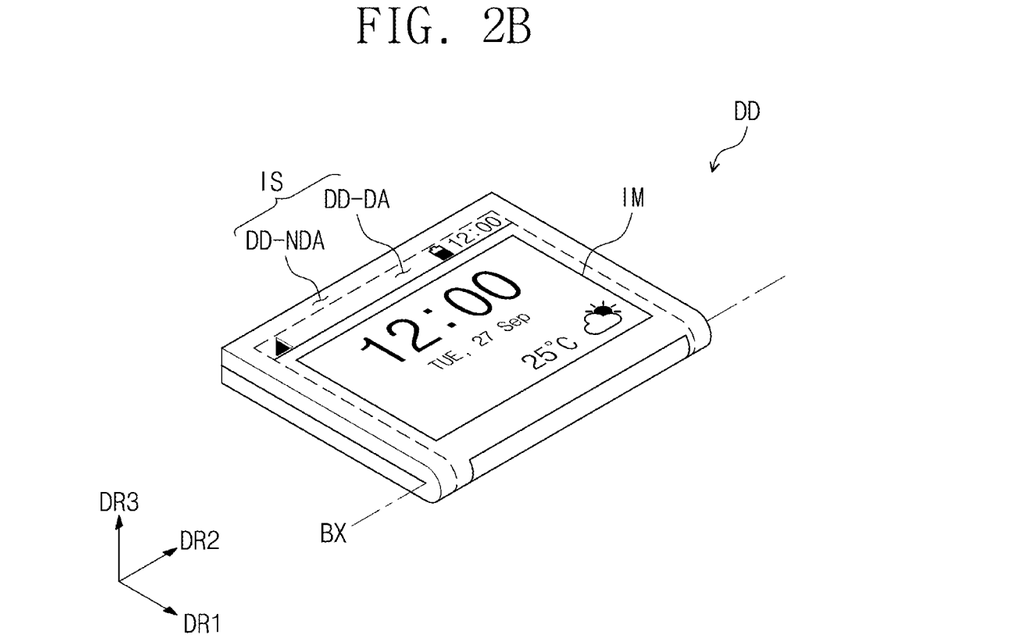
Figure 2C:
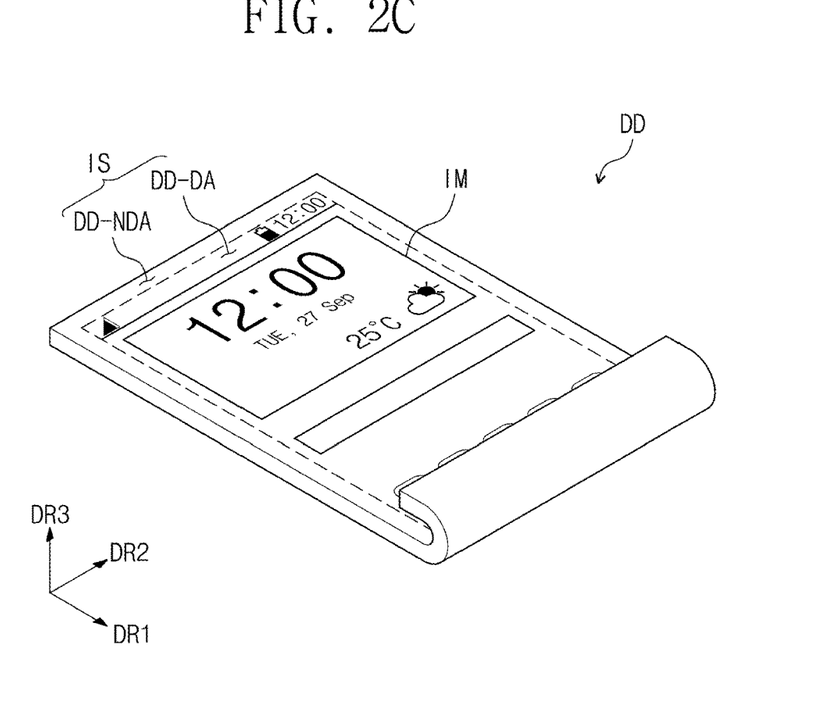
Figure 2D:
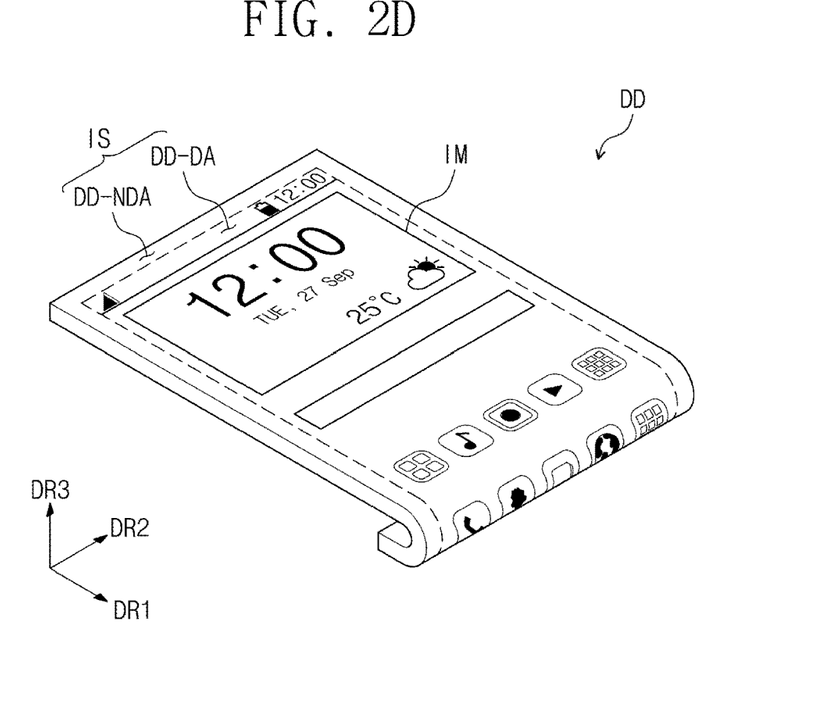
Figure 2E:
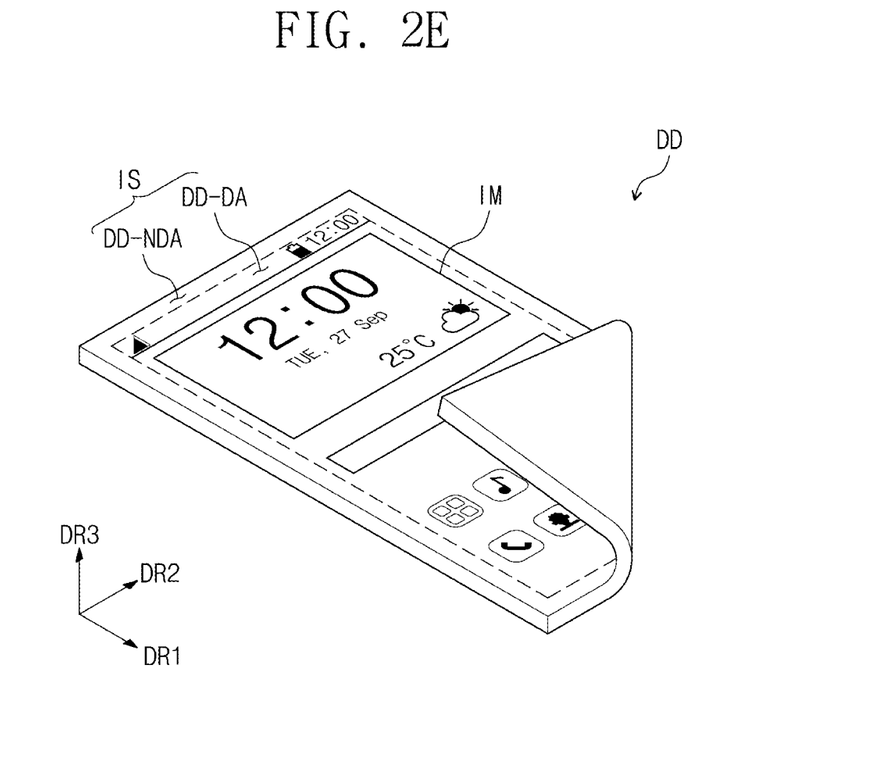
Figure 3:
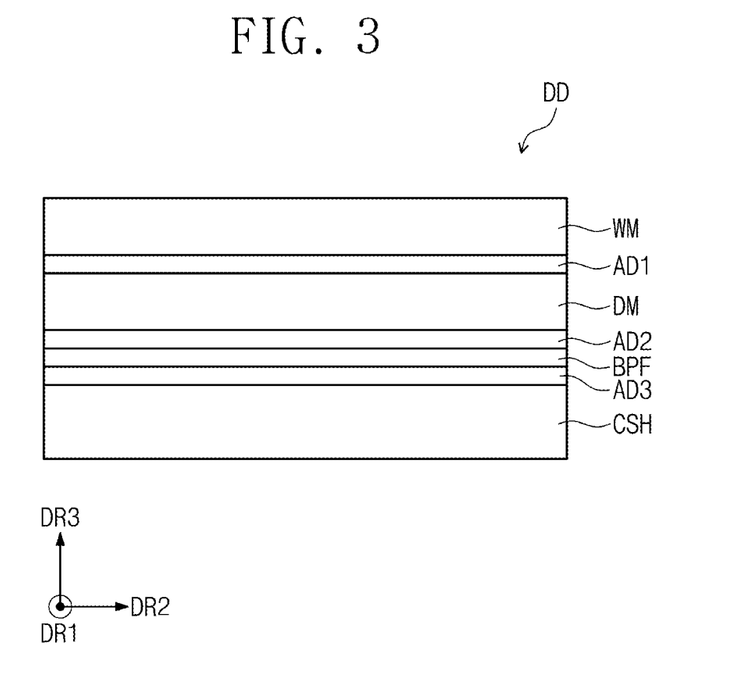
FIG. 3 is a cross-sectional view illustrating the display device according to another embodiment of the inventive concept.

Referring to FIG. 2A, the display device DD according to an embodiment of the inventive concept may be in-folded with respect to a bending axis BX. Referring to FIG. 2B, the display device DD according to an embodiment of the inventive concept may be out-folded with respect to the bending axis BX. Referring to FIG. 2C, the display device DD according to an embodiment of the inventive concept may be folded inward from an end thereof. Referring to FIG. 2D, the display device DD according to an embodiment of the inventive concept may be folded outward from the end thereof. Referring to FIG. 2E, the display device DD according to an embodiment of the inventive concept may be folded in a diagonal direction. Although methods of folding the display device DD are exemplarily illustrated in FIGS. 2A to 2E, the embodiment of the inventive concept is not limited thereto. In other words, the display device DD may be folded at any place and in any direction FIG. 3 is a cross-sectional view illustrating the display device DD according to an embodiment of the inventive concept. FIG. 3 illustrates a cross-section defined by the second direction DR2 and the third direction DR3.

The display device DD may include a window film WM, a display module DM, a lower functional layer BPF, a cushion layer CSH, and a plurality of adhesion layers AD1, AD2, and AD3. The plurality of adhesion layers AD1, AD2, and AD3 may include a first adhesion layer AD1, a second adhesion layer AD2, and a third adhesion layer AD3.

The display device DD may have a structure in which the window film WM, the first adhesion layer AD1, the display module DM, the second adhesion layer AD2, the lower functional layer BPF, and the cushion layer CSH are sequentially laminated. However, the embodiment of the inventive concept is not limited thereto. For example, at least one of the lower functional layer BPF and the cushion layer CSH may be omitted.

Each of the first adhesion layer AD1, the second adhesion layer AD2, and the third adhesion layer AD3 may be an optically clear adhesive film, an optically clear resin, or a pressure sensitive adhesive film. However, the embodiment of the inventive concept is not limited thereto. In another embodiment of the inventive concept, at least one of the first adhesion layer AD1, the second adhesion layer AD2, and the third adhesion layer AD3 may be omitted.

The first adhesion layer AD1 may be disposed between the window film WM and the display module DM and attached to each of the window film WM and the display module DM. The second adhesion layer AD2 may be disposed between the display module DM and the lower functional layer BPF and attached to each of the display module DM and the lower functional layer BPF. The third adhesion layer AD3 may be disposed between the lower functional layer BPF and the cushion layer CSH and attached to each of the lower functional layer BPF and the cushion layer CSH.

The window film WM may be disposed above the display panel DM. The window film WM may include a light transmission portion TPA (refer to FIG. 4A), through which light is transmitted, and a light shielding portion NA (refer to FIG. 4A), by which light is blocked, on a plane.

The window film WM may contain a material for securing flexibility. The window film WM may include at least two films and an adhesion layer for adhering the films.

The display module DM may be a flexible display module or a foldable display module. The display module DM may include a display panel for displaying an image and a sensing unit for detecting a touch and/or a pressure applied from the outside. The sensing unit may be directly disposed on the display panel. Here, an expression of "directly disposed" represents that the sensing unit is integrated with the display panel without a separate adhesion member. Alternatively, in another embodiment of the inventive concept, the sensing unit and the display panel may be formed through different processes and then attached to each other by an adhesion member. In another embodiment of the inventive concept, the sensing unit may be omitted.

The lower functional layer BPF may be disposed on a rear surface of the display module DM. The lower functional layer BPF may be an impact absorption functional layer for adsorbing an impact, a light shielding functional layer for blocking light, a heat dissipation functional layer for dissipating heat, or an EMI shielding layer for blocking electromagnetic wave noises. Although the lower functional layer BPF is illustrated as a single layer in FIG. 3, the embodiment of the inventive concept is not limited thereto. For example, in another embodiment of the inventive concept, the display device DD may include a plurality of lower functional layers. Each of the plurality of lower functional layers may be an impact absorption functional layer, a light shielding functional layer, a heat dissipation functional layer, or an EMI shielding layer.

The cushion layer CSH may be disposed below the lower functional layer BPF. The cushion layer CSH may contain a polymer material. The cushion layer CSH may absorb an impact applied from the outside.

Figure 4A:
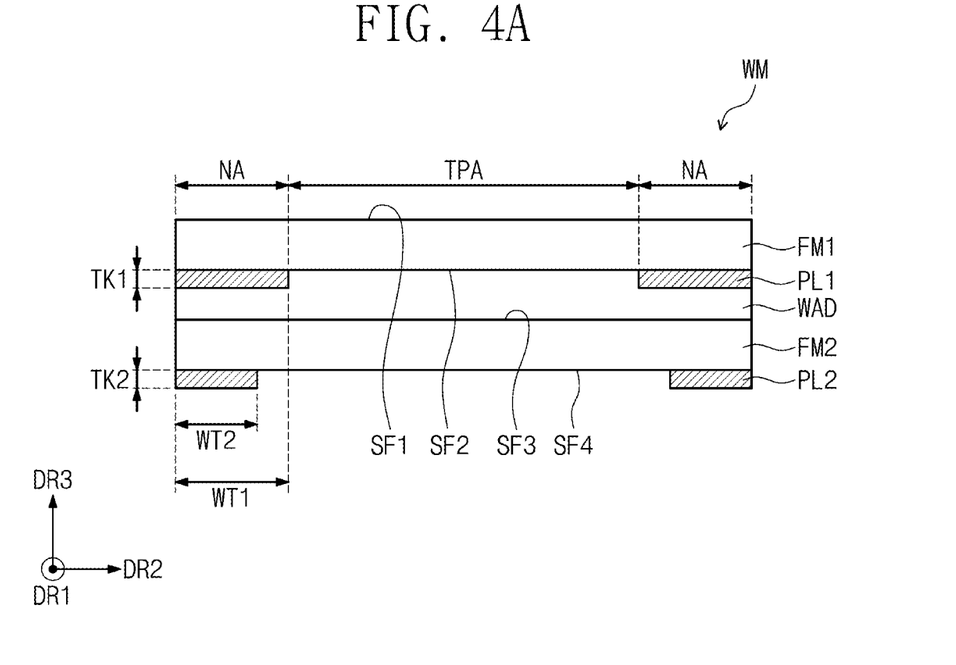
FIG. 4A is a cross-sectional view illustrating a window film according to an embodiment of the inventive concept.

FIG. 4A is a cross-sectional view illustrating the window film WM according to an embodiment of the inventive concept.

Referring to FIG. 4A, the window film WM may include a first film FM1, a second film FM2, a first color layer PL1, a second color layer PL2, and an adhesion layer WAD.

Each of the first film FM1 and the second film FM2 may contain a material for securing flexibility. For example, each of the first film FM1 and the second film FM2 may include at least one of polyimide (PI), polyamideimide (PAI), polyether ether keton (PEEK), and polyetherimide (PEI). However, the embodiment of the inventive concept is not limited to the material of each of the first film FM1 and the second film FM2. In an embodiment of the inventive concept, the first film FM1 and the second film FM2 may contain the same material as each other or different materials from each other. For example, each of the first film FM1 and the second film FM2 may contain a material having a different modulus.

The first film FM1 may have a first surface SF1 and a second surface SF2. The second film FM2 may have a third surface SF3 and a fourth surface SF4. The first surface SF1 may provide an outermost surface of the display device DD (refer to FIG. 3). The second surface SF2 may be disposed below the first surface SF1. The third surface SF3 may face the second surface SF2. The fourth surface SF4 may be disposed below the third surface SF3. The outermost surface may be a surface disposed at an outermost side of a product. For example, a user may receive an image through the outermost surface, and the user may touch the outermost surface to manipulate the display device DD (refer to FIG. 1).

An adhesion layer WAD may be disposed between the first film FM1 and the second film FM2. The adhesion layer WAD may be attached to the second surface SF2 and the third surface SF3. The adhesion layer WAD may include an optically clear adhesive film, an optically clear resin, or a pressure sensitive adhesive film. However, the embodiment of the inventive concept is not limited to the material of the adhesion layer WAD.

The first color layer PL1 and the second color layer PL2 may be disposed within the light shielding portion NA. The first color layer PL1 and the second color layer PL2 may overlap the light shielding portion NA when viewed from above on a plane.

Each of the first color layer PL1 and the second color layer PL2 may have a predetermined color. The color may include various colors such as black, gray, gold, silver, blue, pink, or green.

Each of the first color layer PL1 and the second color layer PL2 may contain a pigment, a dye, an inorganic oxide, or a metallic material. A material of each of the first color layer PL1 and the second color layer PL2 may vary depending on the implementation.

The first color layer PL1 may be disposed on one surface of one of the first film FM1 and the second film FM2, and the second color layer PL2 may be disposed on one surface of the other of the first film FM1 and the second film FM2 which the first color layer PL1 is not disposed. For example, the first color layer PL1 and the second color layer PL2 may be disposed on two surfaces, which are different from each other, of the second surface SF2, the third surface SF3, and the fourth surface SF4. For example, the first color layer PL1 may be disposed on the second surface SF2, and the second color layer PL2 may be disposed on the fourth surface SF4. The first color layer PL1 and the second color layer PL2 may be formed through a printing process. However, the embodiment of the inventive concept is not limited thereto.

The first color layer PL1 may be disposed closer to the first surface SF1 than the second color layer PL2. Accordingly, a layer seen through the outermost surface may be the first color layer PL1. According to an embodiment of the inventive concept, the first color layer PL1 may have an area greater than that of the second color layer PL2. Accordingly, on a cross-section of FIG. 4A, a first width WT1 of the first color layer PL1 in the second direction DR2 may be greater than a second width WT2 of the second color layer PL2 in the second direction DR2. A difference between the first width WT1 and the second width WT2 may be, e.g., about 0.15 mm to about 0.2 mm. Although a predetermined error is generated in a process of aligning the first film FM1, on which the first color layer PL1 is disposed, with the second film FM2, on which the second color layer PL2 is disposed, an appearance defect may be prevented. The appearance defect may represent a feature in which the second color layer PL2 is seen through an area on which the first color layer PL1 is not disposed.

The first color layer PL1 may have a first thickness TK1, and the second color layer PL2 may have a second thickness TK2. A sum of the first thickness TK1 and the second thickness TK2 may be about 5 µm or more and about 15 µm or less. For example, the sum of the first thickness TK1 and the second thickness TK2 may be about 7 µm or more and about 9 µm or less.

The color layer is required to have a predetermined thickness so that the light shielding portion NA has a light shielding effect. This is defined as a target thickness. According to an embodiment of the inventive concept, when the target thickness is determined, the target thickness may be realized by using a plurality of color layers, e.g., the first color layer PL1 and the second color layer PL2.

Each of the first thickness TK1 and the second thickness TK2 may be equal to or less than about 7 µm and greater than about 0 µm. For example, when each of TK1 and TK2 is thicker than about 7 µm, may cause a defect, generating a crack in the color layer, or delaminating the color layer from the film, after repeated operations of the display device DD (refer to FIG. 3).

Also, according to an embodiment of the inventive concept, the window film WM includes a plurality of color layers, e.g., the first color layer PL1 and the second color layer PL2. Accordingly, each of the first thickness TK1 of the first color layer PL1 and the second thickness TK2 of the second color layer PL2 may be reduced. As a result, a phenomenon, in which a crack is generated in the first color layer PL1 and the second color layer PL2 or the first color layer PL1 is delaminated from the first film FM1, and a phenomenon, in which the second color layer PL2 is delaminated from the second film FM2, due to the repeated folding or bending operations of the display device DD (refer to FIG. 3) may be prevented.

Another embodiment of the inventive concept, may be elimination of one of the first color layer PL1 and the second color layer PL2. For example, when the second color layer PL2 is omitted, the first thickness TK1 of the first color layer PL1 may be about 7 µm or less. For example, the first thickness TK1 of the first color layer PL1 may be about 5 µm.

Figure 4B:
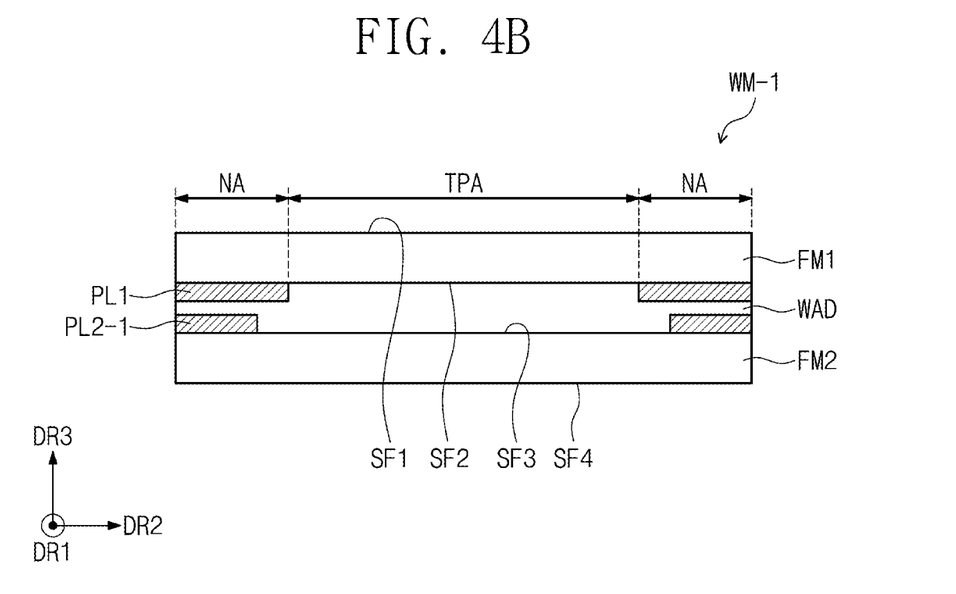
FIG. 4B is a cross-sectional view illustrating a window film according to an embodiment of the inventive concept.

FIG. 4B is a cross-sectional view illustrating a window film WM-1 according to an embodiment of the inventive concept. In describing FIG. 4B, components overlapping those in FIG. 4A will be designated by the same reference numerals, and descriptions thereof will not be repeated.

Referring to FIG. 4B, the window film WM-1 may include a first film FM1, a second film FM2, a first color layer PL1, a second color layer PL2-1, and an adhesion layer WAD.

The second color layer PL2-1 may be disposed on a third surface SF3 of the second film FM2. The second color layer PL2-1 may overlap the first color layer PL1 and be disposed within a light shielding portion NA. The first color layer PL1 may be disposed closer to a first surface SF1 than the second color layer PL2-1. Accordingly, a layer seen through the outermost surface may be the first color layer PL1. According to an embodiment of the inventive concept, the first color layer PL1 may have an area greater than that of the second color layer PL2-1.

Figure 4C:
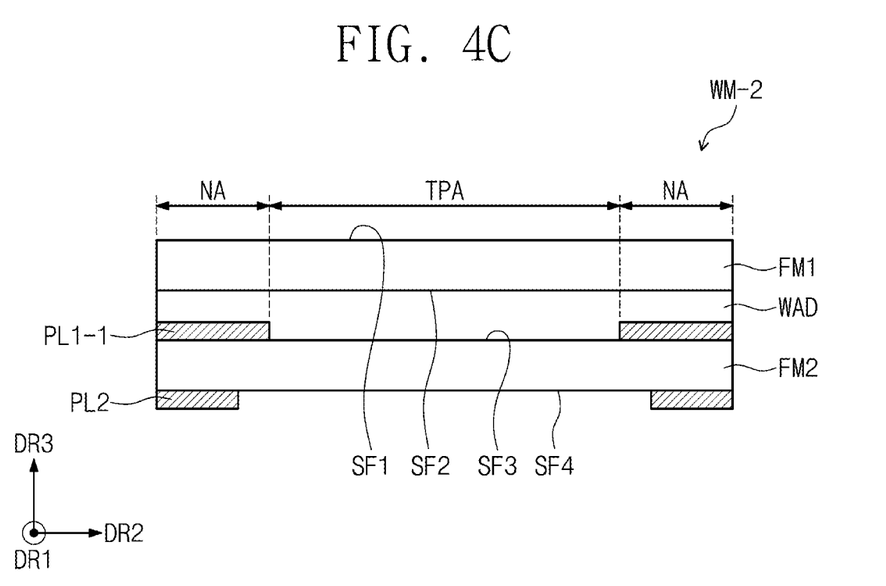
FIG. 4C is a cross-sectional view illustrating a window film according to an embodiment of the inventive concept.

FIG. 4C is a cross-sectional view illustrating a window film WM-2 according to an embodiment of the inventive concept. In describing FIG. 4C, components overlapping those in FIG. 4A will be designated by the same reference numerals, and descriptions thereof will not be repeated.

Referring to FIG. 4C, the window film WM-2 may include a first film FM1, a second film FM2, a first color layer PL1-1, a second color layer PL2, and an adhesion layer WAD.

The first color layer PL1-1 may be disposed on a third surface SF3 of the second film FM2. The first color layer PL1-1 may overlap the second color layer PL2 and be disposed within a light shielding portion NA.

According to an embodiment of the inventive concept, for example, all of the first color layer PL1-1 and the second color layer PL2 may be disposed, e.g., printed, on one film, e.g., the second film FM2. Thus, a degree of alignment between the first color layer PL1-1 and the second color layer PL2 may further improve than that when the first color layer PL1-1 and the second color layer PL2 are disposed on different films from each other.

Figure 5A:
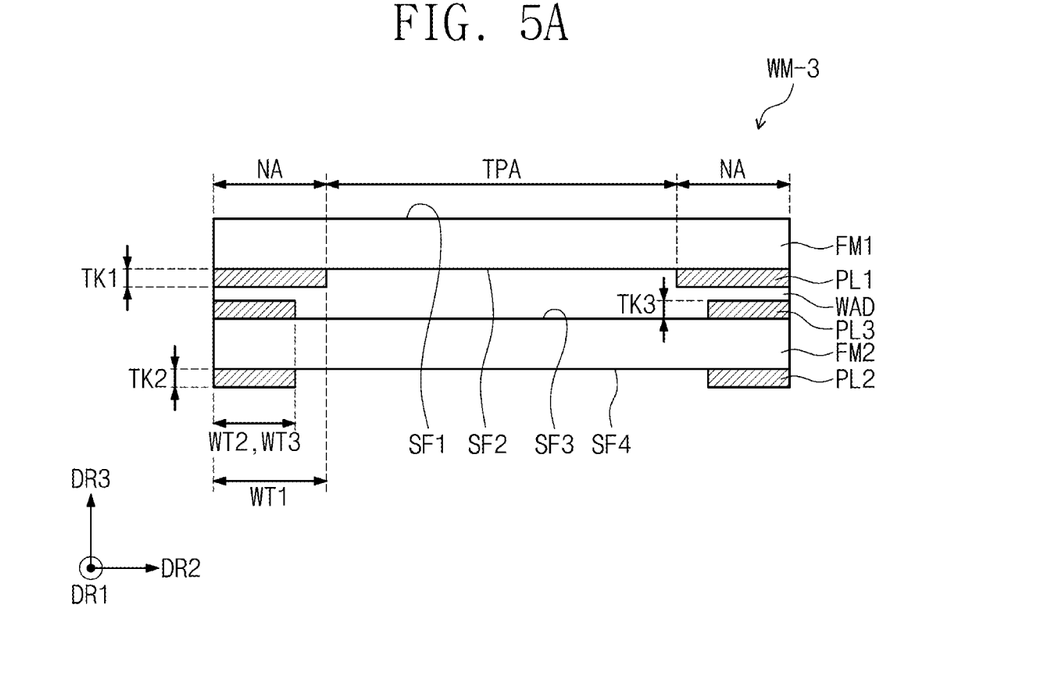
FIG. 5A is a cross-sectional view illustrating a window film according to an embodiment of the inventive concept.

FIG. 5A is a cross-sectional view illustrating a window film WM-3 according to an embodiment of the inventive concept. In describing FIG. 5A, components overlapping those in FIG. 4A will be designated by the same reference numerals, and description thereof will not be repeated.

Referring to FIG. 5A, the window film WM-3 may include a first film FM1, a second film FM2, a first color layer PL1, a second color layer PL2, a third color layer PL3, and an adhesion layer WAD.

The third color layer PL3 may be disposed on a third surface SF3 of the second film FM2. The first color layer PL1, the second color layer PL2, and the third color layer PL3 may overlap each other and be disposed within a light shielding portion NA.

On a cross-section, the third color layer PL3 may be disposed between the first color layer PL1 and the second color layer PL2. According to an embodiment of the inventive concept, the first color layer PL1 may have an area greater than that of each of the second color layer PL2 and the third color layer PL3. The second color layer PL2 may have an area equal to that of the third color layer PL3.

A first width WT1 of the first color layer PL1 in the second direction DR2 may be greater than each of a second width WT2 of the second color layer PL2 in the second direction DR2 and a third width WT3 of the third color layer PL3 in the second direction DR2. Although a predetermined error is generated in a process of aligning the first film FM1, on which the first color layer PL1 is disposed, with the second film FM2, on which the second color layer PL2 is disposed, an appearance defect may be prevented. A difference between the first width WT1 and the second width WT2 and a difference between the first width WT1 and the third width WT3 may be, e.g., about 0.15 mm to about 0.2 mm. The second width WT2 and the third width WT3 may be equal to each other.

A first thickness TK1 of the first color layer PL1, a second thickness TK2 of the second color layer PL2, and a third thickness TK3 of the third color layer PL3 may be further reduced than that when one color layer is provided. As a result, a phenomenon, in which a crack is generated in the first color layer PL1, the second color layer PL2, and the third color layer PL3 or the first color layer PL1 is delaminated from the first film FM1, a phenomenon, in which the second color layer PL2 is delaminated from the second film FM2, and a phenomenon, in which the third color layer PL3 is delaminated from the second film FM2, due to the repeated operations of the display device DD (refer to FIG. 3) may be prevented.

Figure 5B:
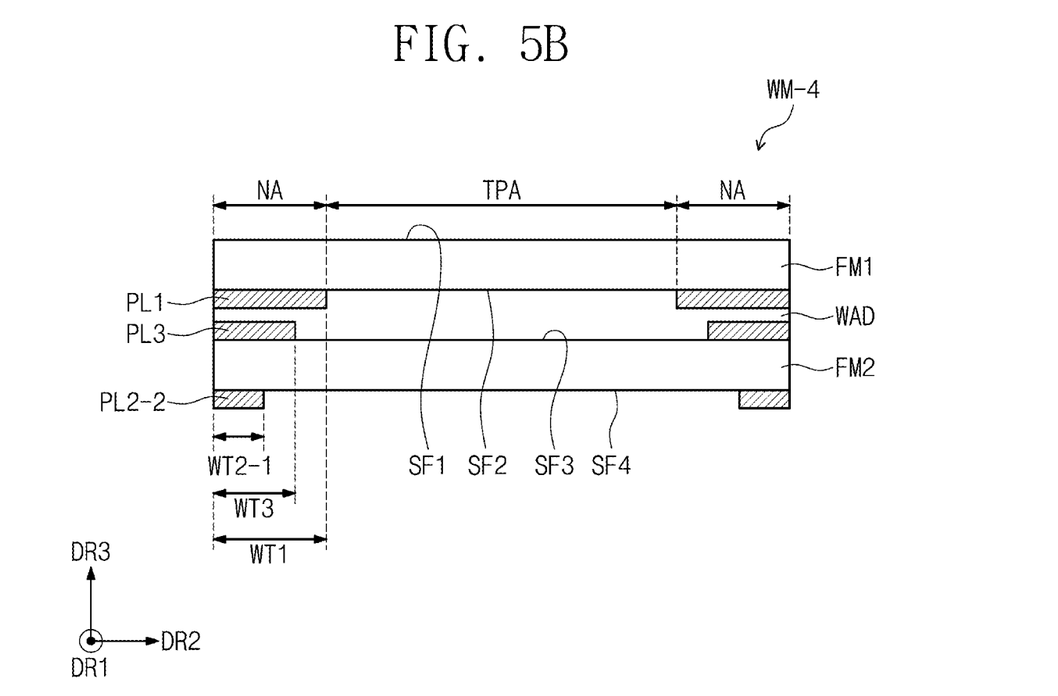
FIG. 5B is a cross-sectional view illustrating a window film according to an embodiment of the inventive concept.

FIG. 5B is a cross-sectional view illustrating a window film WM-4 according to an embodiment of the inventive concept. In describing FIG. 5B, components overlapping those in FIG. 5A will be designated by the same reference numerals, and descriptions thereof will be omitted.

Referring to FIG. 5B, the window film WM-4 may include a first film FM1, a second film FM2, a first color layer PL1, a second color layer PL2-2, a third color layer PL3, and an adhesion layer WAD.

On a cross-section, the third color layer PL3 may be disposed between the first color layer PL1 and the second color layer PL2-2. According to an embodiment of the inventive concept, the first color layer PL1 may have an area greater than that of each of the second color layer PL2-2 and the third color layer PL3. The third color layer PL3 may have an area larger than that of the second color layer PL2-2.

A first width WT1 of the first color layer PL1 in the second direction DR2 may be greater than each of a second width WT2-1 of the second color layer PL2-2 in the second direction DR2 and a third width WT3 of the third color layer PL3 in the second direction DR2. The third width WT3 may be greater than the second width WT2-1.

A difference between the first width WT1 and the third width WT3 and a difference between the second width WT2-1 and the third width WT3 may be, e.g., about 0.15 mm to about 0.2 mm.

Figure 6:
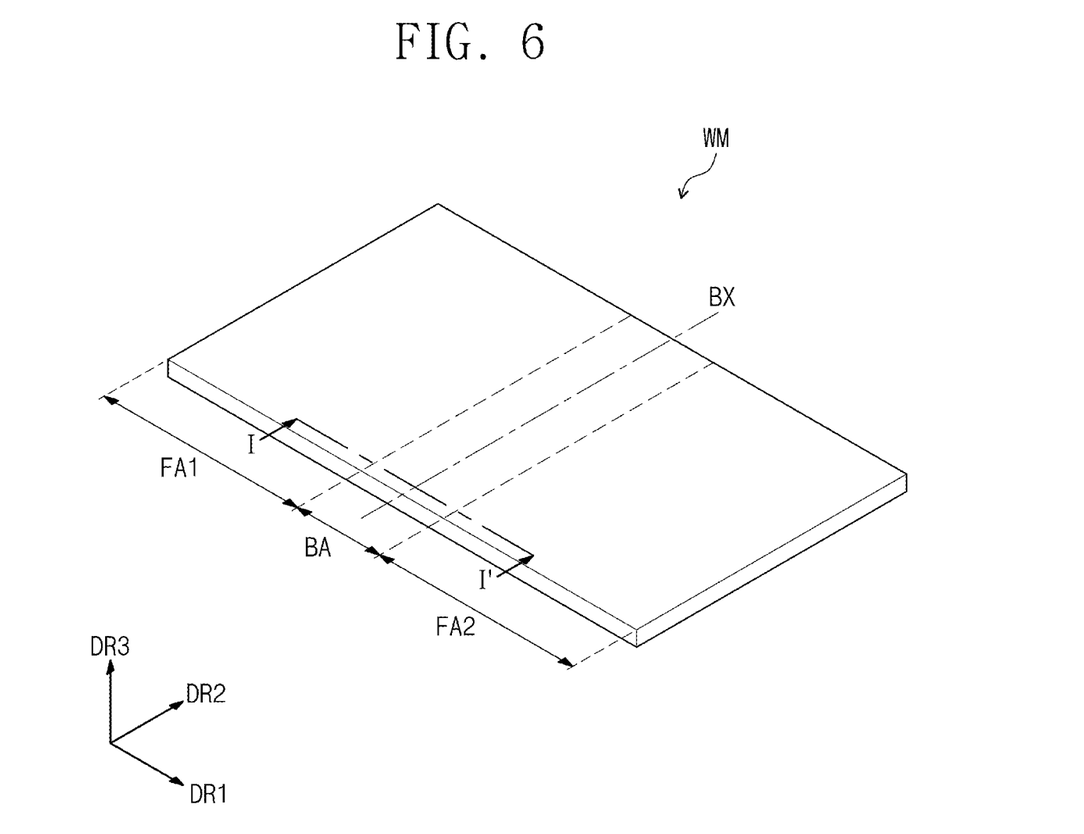
FIG. 6 is a perspective view illustrating a window film according to an embodiment of the inventive concept.

FIG. 6 is a perspective view illustrating a window film WM according to an embodiment of the inventive concept.

Referring to FIGS. 2A, 2B, and 6, as the display device DD is folded with respect to the folding axis BX, the window film WM may be also folded with respect to the folding axis BX.

The window film WM may include first portions FA1 and FA2 and a second portion BA. For example, the first portions FA1 and FA2 may be a non-bendable flat portions, and the second portion BA may be a bendable and foldable portion.

The first portions FA1 and FA2 may include a first non-bendable portion FA1 and a second non-bendable portion FA2. The second portion BA may be disposed adjacent to each of the first non-bendable portion FA1 and the second non-bendable portion FA2.

In an embodiment of the inventive concept, the second portion BA may be defined between the first non-bendable portion FA1 and the second non-bendable portion FA2. In case of the display device having the fixed bending axis BX, the first portion FA1 and FA2 and the second portion BA may be fixed.

Figure 7A:
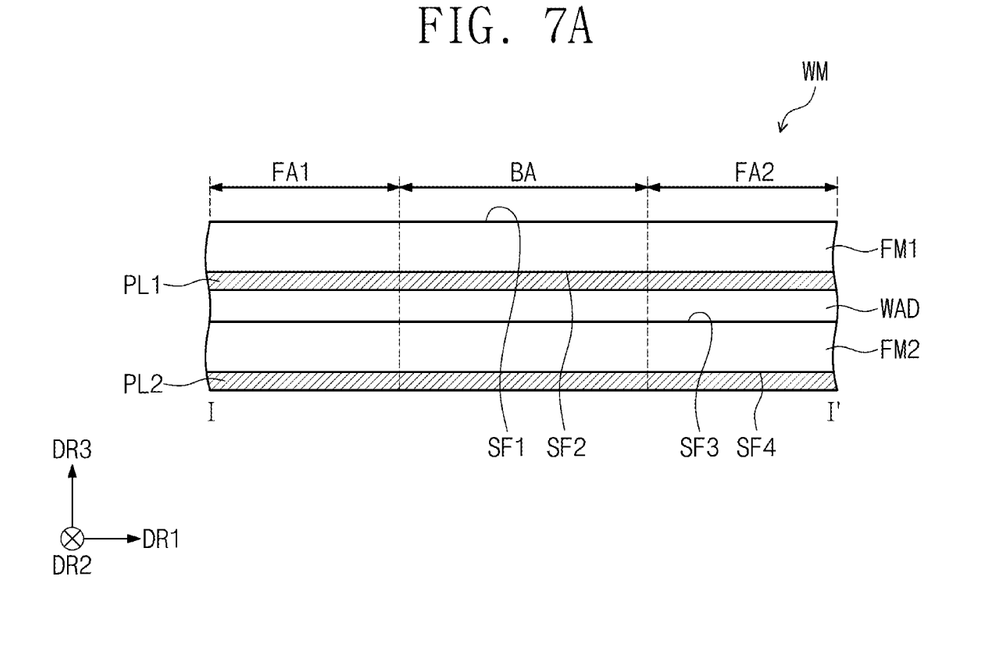
FIG. 7A is a cross-sectional view taken along line I-I' of FIG. 6.

FIG. 7A is a cross-sectional view taken along line I-I' of FIG. 6.

Referring to FIG. 7A, a first color layer PL1 and a second color layer PL2 may be disposed on each of the first portion FA1 and FA2 and the second portion BA of the window film WM.

According to an embodiment of the inventive concept, the first color layer PL1 may have a constant thickness over all of the first portions FA1 and FA2 and the second portion BA. The second color layer PL2 may have a constant thickness over all of the first portions FA1 and FA2 and the second portion BA. The window film WM may be replaced by one of the window films WM-1, WM-2, WM-3, and WM-4 described previously in FIGS. 4B, 4C, 5A, and 5B.

Figure 7B:
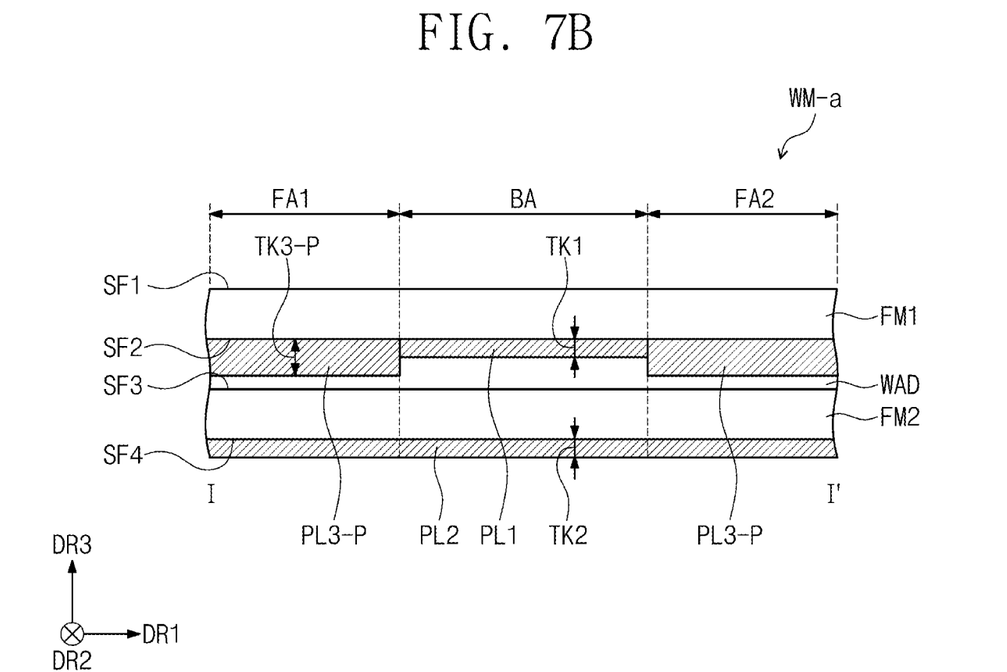
FIG. 7B is a cross-sectional view illustrating a portion corresponding the portion taken along line I-I' of FIG. 6.

FIG. 7B is a cross-sectional view illustrating a portion corresponding the portion taken along line I-I' of FIG. 6.

Referring to FIG. 7B, a window film WM-a may include a third color layer PL3-P disposed on a first portion FA1 and FA2. A first color layer PL1 and a second color layer PL2 may be disposed on a second portion BA of the window film WM-a, and a third color layer PL3-P may be disposed on the first portions FA1 and FA2 of the window film WM-a.

Although the third color layer PL3-P is exemplarily disposed on a second surface SF2 in FIG. 7B, the embodiment of the inventive concept is not limited thereto. For example, in another embodiment of the inventive concept, the third color layer PL3-P may be disposed on the third surface SF3 or a fourth surface SF4.

The first portions FA1 and FA2 may be a non-bendable portion. Accordingly, a stress applied to the color layer disposed on the first portions FA1 and FA2 may be less than that applied to the color layer disposed on the second portion BA. A plurality of color layers may be provided only on the second portion BA, which is a bendable portion, and a single color layer may be provided on the first portions FA1 and FA2, which is a flat portion.

The first color layer PL1 may have a first thickness TK1, the second color layer PL2 may have a second thickness TK2, and the third color layer PL3-P may have a third thickness TK3-P. The third thickness TK3-P may be greater than each of the first thickness TK1 and the second thickness TK2. The third thickness TK3-P may be substantially equal to a sum of the first thickness TK1 and the second thickness TK2.

Figure 8A:
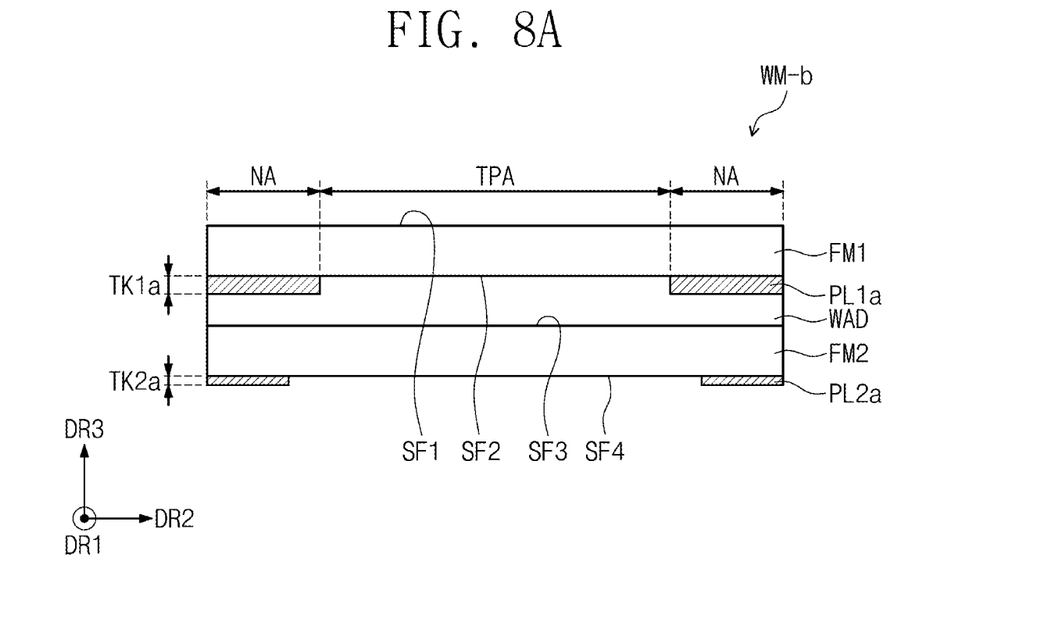
FIG. 8A is a cross-sectional view illustrating a window film according to an embodiment of the inventive concept.

FIG. 8A is a cross-sectional view illustrating a window film WM-b according to an embodiment of the inventive concept. In describing FIG. 8A, components overlapping those in FIG. 5A will be designated by the same reference numerals, and descriptions thereof will be omitted.

Referring to FIG. 8A, the window film WM-b may include a first film FM1, a second film FM2, a first color layer PL1$a$, a second color layer PL2$a$, and an adhesion layer WAD.

The first color layer PL1$a$ may have a first thickness TK1$a$, and the second color layer PL2$a$ may have a second thickness TK2$a$. The first thickness TK1$a$ may be greater than the second thickness TK2$a$.

According to an embodiment of the inventive concept, depending on a folding type of the display device DD (refer to FIG. 2A), a thickness of each of the color layers may be adjusted. For example, as illustrated in FIG. 2A, when the display device DD has a structure capable of being in-folded only, a stress applied to the first color layer PL1$a$ may be less than that applied to the second color layer PL2$a$. In this case, the second thickness TK2$a$ of the second color layer PL2$a$ to which a stress is further applied may be reduced.

Figure 8B:
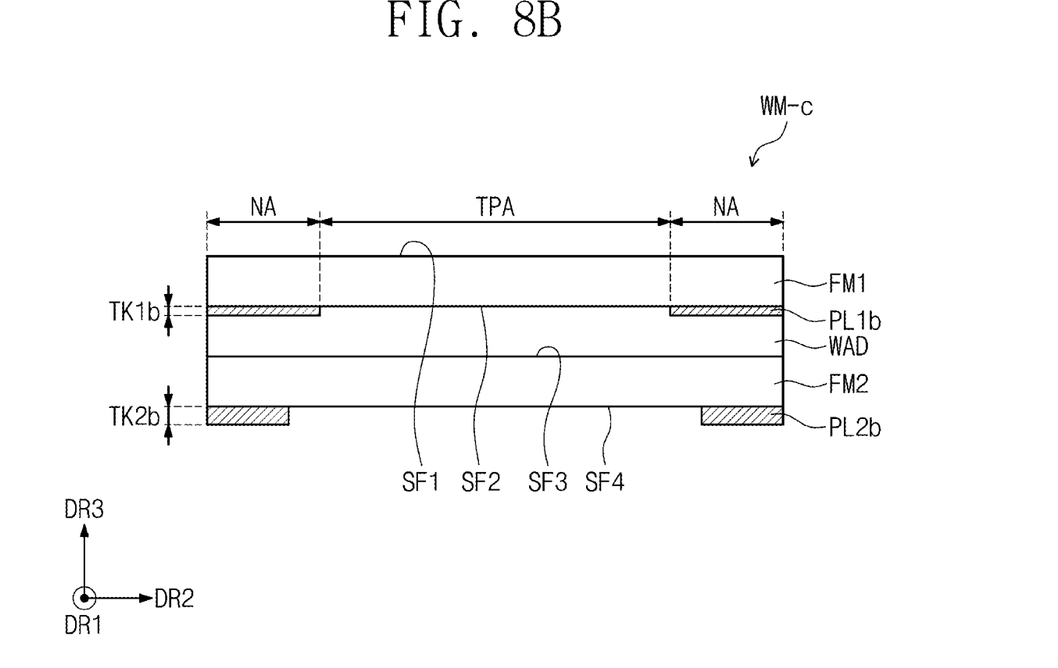
FIG. 8B is a cross-sectional view illustrating a window film according to an embodiment of the inventive concept.

FIG. 8B is a cross-sectional view illustrating a window film WM-c according to an embodiment of the inventive concept. In describing FIG. 8B, components overlapping those in FIG. 5A will be designated by the same reference numerals, and descriptions thereof will be omitted.

Referring to FIG. 8B, the window film WM-c may include a first film FM1, a second film FM2, a first color layer PL1$b$, a second color layer PL2$b$, and an adhesion layer WAD.

The first color layer PL1$b$ may have a first thickness TK1$b$, and the second color layer PL2$b$ may have a second thickness TK2$b$. The first thickness TK1$b$ may be less than the second thickness TK2$b$.

According to an embodiment of the inventive concept, depending on a folding type of the display device DD (refer to FIG. 2B), a thickness of each of the color layers may be adjusted. For example, as illustrated in FIG. 2B, when the display device DD has a structure capable of being out-folded only, a stress applied to the first color layer PL1$b$ may be greater than that applied to the second color layer PL2$b$. In this case, the first thickness TK1$b$ of the first color layer PL1$b$ to which a stress is further applied may be reduced.

The window member of the flexible display device includes the plurality of color layers. Accordingly, the thickness of each of the color layers may be thinner than that of the single color layer. Thus, the phenomenon in which a crack is generated in each of the color layers or each of the color layers is delaminated from the film due to the repeated folding or bending operations of the display device may be prevented. Also, the area of the color layer disposed adjacent to the outermost surface may be greater than that of each of other next level inner or lower color layers. Thus, the appearance defect that may show the lower color layer when the color layers are misaligned may be diminished.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A foldable display device having a display area and a non-display area adjacent to the display area, comprising:
    a foldable display module;
    a window film disposed on the foldable display module and having a folding area and a non-folding area; and
    at least one color layer disposed between the foldable display module and the window film and overlapping a portion of the non-display area,
    wherein the non-display area has a first area and a second area between the display area and the first area,
    wherein a first thickness of a first portion of the at least one color layer overlapping the first area is about 7 μm or more and a second thickness of a second portion of the at least one color layer overlapping the second area is less than 7 μm, and
    wherein the foldable display module displays an image through a portion of the window film.

2. The foldable display device of claim 1, wherein the second thickness is different from a difference between the first thickness and the second thickness.

3. The foldable display device of claim 2, wherein the window film is disposed between a first portion of the foldable display module and a second portion of the foldable display module in a folded state, and
    the second thickness is greater than the difference between the first thickness and the second thickness.

4. The foldable display device of claim 2, wherein the foldable display module is disposed between a first portion of the window film and a second portion of the window film in a folded state, and
    the second thickness is smaller than the difference between the first thickness and the second thickness.

5. The foldable display device of claim 1, wherein a color of the at least one color layer is black.

6. The foldable display device of claim 1, wherein the at least one color layer comprises a first color layer overlapping the first area and the second area and a second color layer overlapping the first area.

7. The foldable display device of claim 6, wherein the second color layer does not overlap the second area.

8. The foldable display device of claim 6, wherein the second color layer is disposed between the first color layer and the foldable display module.

9. The foldable display device of claim 1, wherein the first thickness is about 15 μm or less.

10. The foldable display device of claim 1, wherein the second thickness is greater than about 0 μm.

11. The foldable display device of claim 1, when viewed in a plan view, the second area surrounds the portion of the window film, and the first area surrounds the second area.

12. The foldable display device of claim 1, wherein the portion of the window film is a light transmission portion.

13. The foldable display device of claim 12, wherein the light transmission portion is defined by an edge of the second portion of the at least one color layer.

* * * * *